United States Patent
Hsu et al.

(10) Patent No.: US 9,891,846 B2
(45) Date of Patent: Feb. 13, 2018

(54) SYSTEM AND METHOD FOR PREVENTING SOLID STATE DRIVE CORRUPTION AFTER DIRTY SHUTDOWN POWER LOSS

(71) Applicant: Dell Products, LP, Round Round, TX (US)

(72) Inventors: Isaac Hsu, Taipei (TW); Adolfo S. Montero, Pflugerville, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 2 days.

(21) Appl. No.: 14/675,299

(22) Filed: Mar. 31, 2015

(65) Prior Publication Data
US 2016/0292078 A1   Oct. 6, 2016

(51) Int. Cl.
*G06F 12/00* (2006.01)
*G06F 3/06* (2006.01)
*G06F 12/0891* (2016.01)
*G06F 12/0866* (2016.01)

(52) U.S. Cl.
CPC ........ *G06F 3/0619* (2013.01); *G06F 3/0652* (2013.01); *G06F 3/0656* (2013.01); *G06F 3/0659* (2013.01); *G06F 3/0679* (2013.01); *G06F 12/0866* (2013.01); *G06F 12/0891* (2013.01); *G06F 2212/1032* (2013.01); *G06F 2212/214* (2013.01); *G06F 2212/222* (2013.01); *G06F 2212/281* (2013.01); *G06F 2212/313* (2013.01)

(58) Field of Classification Search
CPC ............ G06F 12/0891; G06F 12/0866; G06F 2212/214; G06F 2212/1032; G06F 3/0619; G06F 3/0656; G06F 3/0659
See application file for complete search history.

(56) References Cited

U.S. PATENT DOCUMENTS

| | | | |
|---|---|---|---|
| 7,130,962 B2 | 10/2006 | Garney | |
| 8,639,881 B2 * | 1/2014 | Kurashige | G06F 12/0866 711/103 |
| 2009/0222627 A1 * | 9/2009 | Reid | G06F 12/0804 711/135 |
| 2010/0042773 A1 * | 2/2010 | Yeh | G06F 12/0804 711/103 |
| 2010/0107016 A1 * | 4/2010 | Colman | G06F 11/0754 714/48 |

* cited by examiner

*Primary Examiner* — David X Yi
*Assistant Examiner* — Alan Otto
(74) *Attorney, Agent, or Firm* — Larson Newman, LLP

(57) ABSTRACT

An information handling system a first controller and a solid state drive. The first controller receives an indication that a forced shutdown of the information handling system has been initiated, and triggers a cache flush command in response to receiving the indication that the forced shutdown has been initiated. The solid state drive includes a memory to store data, a cache to buffer data prior to writing the data in the memory, and a second controller. The second controller receives the cache flush command, and flushes the cache by writing the data in the cache to the memory in response to the cache flush command being received.

18 Claims, 3 Drawing Sheets

SYSTEM AND METHOD FOR PREVENTING SOLID STATE DRIVE CORRUPTION AFTER DIRTY SHUTDOWN POWER LOSS

FIELD OF THE DISCLOSURE

The present disclosure generally relates to system and method for preventing solid state drive corruption after dirty shutdown power loss.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among info nation handling systems may be via networks that are wired, wireless, or some combination.

An information handling system can include a solid state drive for the storage of system information and data. The solid state drive can buffer data in a cache prior to storing the data in a memory location of the solid state drive.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
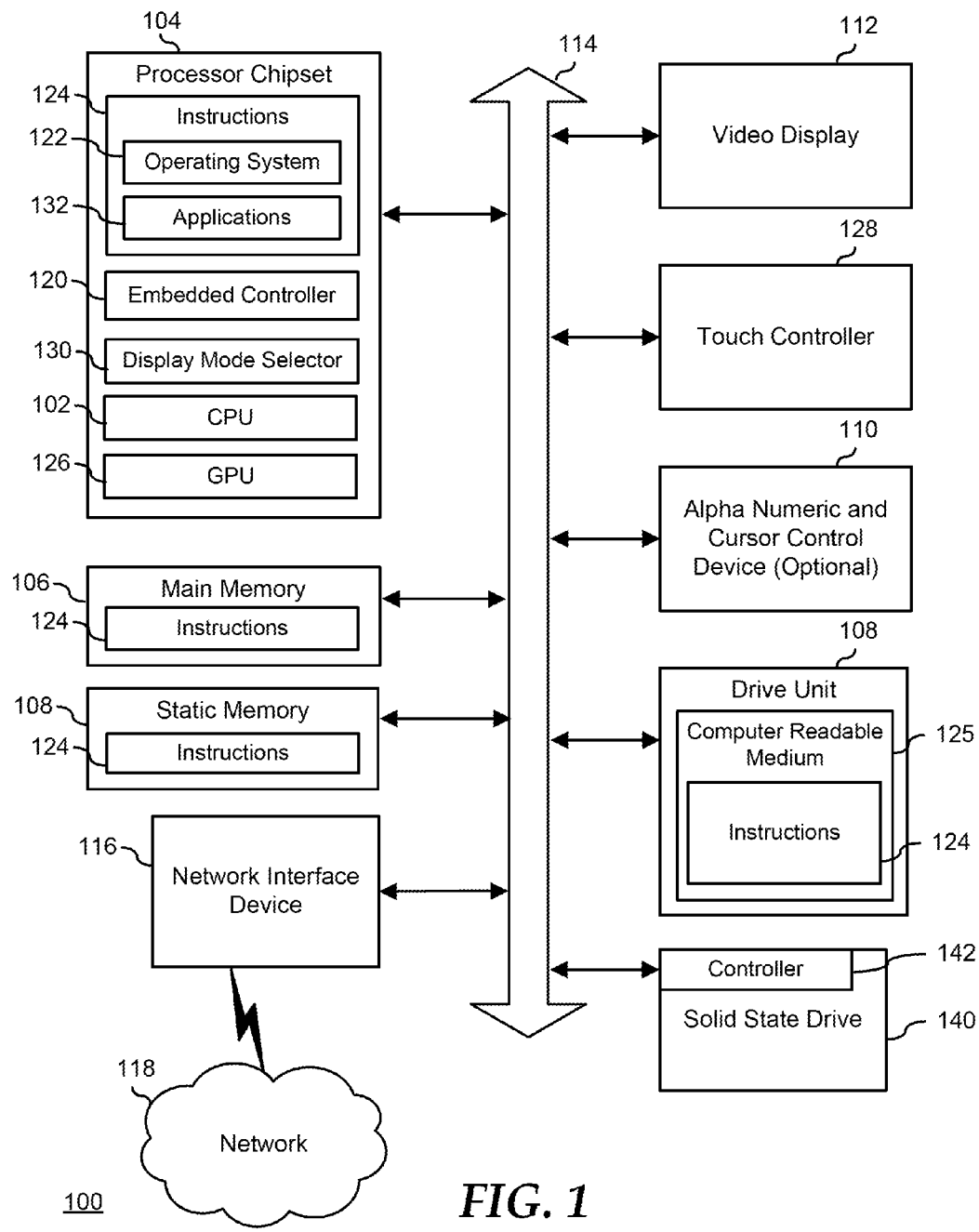
FIG. 1 is a block diagram of an information handling system according to at least one embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer, such as desktop or laptop, tablet computer, mobile device (e.g., personal digital assistant (PDA) or smart phone), server (such as blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In an embodiment, an information handling system includes a power button, a basic input/output system (BIOS), an embedded controller, and a solid state drive according to at least one embodiment of the present disclosure. The solid state drive can include a controller, a cache, and a memory. During operation of the information handling system, the controller can receive read and/or write instructions for the memory of the solid state drive. In an embodiment, an individual can cause a forced shutdown of the information handling system by pressing and holding the power button for a predetermined amount of time. The embedded controller can monitor the power button, can detect when the power button is pressed, and can determine that a forced shutdown of the information handling system has been initiated.

The embedded controller can then provide a cache command to the controller of solid state drive. Upon receiving the cache flush command, the controller can issue a cache flush in the solid state drive. In an embodiment, data that is to be written to non-volatile memory of the solid state drive can be first stored in a cache of the solid state drive. Thus, the cache flush can cause the data stored in the cache to be written to the non-volatile memory of the solid state drive. In an embodiment, writing the data from the cache to the memory can be completed in less time than the predetermined amount of time needed to complete the request for the forced shutdown. Therefore, any data in the cache, when a forced shutdown is initiated, can be stored in the nonvolatile memory prior to the forced shutdown operation being completed. In an embodiment, if the force shutdown is aborted, such that the individual releases the power button prior to the end the predetermined amount of time, the embedded controller can send a signal to the controller to cause the controller and the solid state drive to resume normal operations.

FIG. 1 shows an information handling system 100 including conventional information handling systems components of a type typically found in client/server computing environments. The information handling system 100 may include memory, one or more processing resources such as a central processing unit (CPU) 102 and related chipset(s) 104 or hardware or software control logic. Additional components of system 100 may include main memory 106, one or more storage devices such as static memory or disk drives 108, an optional external input device 110 such as a keyboard, and a cursor control device such as a mouse, or a video display 112. The information handling system 100 may also include one or more buses 114 operable to transmit communications between the various hardware components.

More specifically, system 100 represents a mobile user/client device, such as a dual screen mobile tablet computer. System 100 has a network interface device 116, such as for a wireless cellular or mobile networks (CDMA, TDMA, or the like), WIFI, WLAN, LAN, or similar network connection, enabling a user to communicate via a wired or wireless communications network 118, such as the Internet. System 100 may be configured with conventional web browser software. The web browser, may include for example Microsoft Corporation's Internet Explorer web browser software, Firefox or similar such browsers to allow the user to interact with websites via the wireless communications network 118.

System 100 may include a several sets of instructions 124 to be run by CPU 102 and any embedded controllers 120 on system 100. The instructions 124 can be stored in a computer readable medium 125 of a drive unit 108. One such set of instructions includes an operating system 122 with operating system interface. Additional sets of instructions in the form of multiple software applications 124 may be run by system 100. These software applications 124 may enable multiple uses of the dual display information handling system as set forth in more detail below.

System 100 includes a display screen 112. The display screen 112 has a display driver operated by one or more graphics processing units (GPUs) 126 such as those that are part of the chipset 104. The display screen 112 also has an associated touch controller 128 to accept touch input on the touch interface of the display screen.

The display screen 112 may also be controlled by the embedded controller 120 of chipset 108. Each GPU 126 and display driver is responsible for rendering graphics such as software application windows and virtual tools such as virtual keyboards on the display 112. Control of the location and positioning of these windows may be set by user input to locate the screens or by control setting default. In several embodiments described herein, control of the location for rendering for software application windows and virtual tools in the display may be determined by an application window locator system as described further in the embodiments herein. The application window locator system determines operating state rank of running software applications and determines whether and where to display application display windows and virtual tools based on relative orientation and state of usage information. Windows may include other forms of display interface with software application besides a window. It is contemplated that tiles, thumbnails, and other visual application access and viewing methods via a display are contemplated to be considered windows. Virtual tools may include virtual keyboard, virtual touchpad or controller, virtual buttons and other input devices rendered via a display screen and accepting feedback via a touch control system.

In another example of display control via the disclosures herein, the power to the display screen 112 is controlled by an embedded controller 120 in the processor chipset(s) which manages a battery management unit (BMU) as part of a power management unit (PMU) in the BIOS/firmware of the main CPU processor chipset(s). These controls form a part of the power operating system. The PMU (and BMU) control power provision to the display screen and other components of the dual display information handling system.

A display mode selector 130, in connection with an application window locator system as described in more detail below, determines priority of concurrently running software applications and how to automatically locate software application display windows and virtual tools on the screen via the chipset 104 based upon orientation of the display screen 112 as well as the software applications 132 currently running and active and their status. Determining which applications 132 are running determines a working software application context. Alternatively, the application window locator may operate on an embedded controller 120 separate from the main CPU chipset(s) 104. Additionally, the power management application may receive state of usage activity input from device state sensors.

In an embodiment, the information handling system 100 includes a solid state drive 140 to store data in the information handling system. In an embodiment, the solid state drive 140 can include a controller 142, which can perform operations within the solid state drive, such as buffer data in a cache prior to writing the data to a memory location of the solid state drive, read/write data from/to different memory locations, flush the cache, or the like. In an embodiment, the controller 142 can communicate with the embedded controller 120, and can receive commands from the embedded controller, such as flush the cache of the solid state drive, resume normal operations, or the like.

In an embodiment, the embedded controller 120 can receive an indication of a forced shutdown, such as an individual pressing holding a power button of the information handling system 100 for a predetermined amount of time. The embedded controller 120 can then provide a cache flush command to the controller 142 of the solid state drive 140. Upon receiving the cache flush command, the controller 142 can flush a cache of the solid state drive 140. For example, the controller 142 can issue a command to store the data in the cache into a non-volatile memory location of the solid state drive.

The embedded controller 120 can then determine whether the forced shutdown is aborted. If the force shutdown is not aborted, the information handling system 100 can shutdown with the data that was in the cache when the forced shutdown started stored in the non-volatile memory location of the solid state drive 140. However, if the forced shutdown is aborted, the embedded controller 120 can provide the controller 142 with a signal to cause the controller to resume normal operation.

Figure 2:
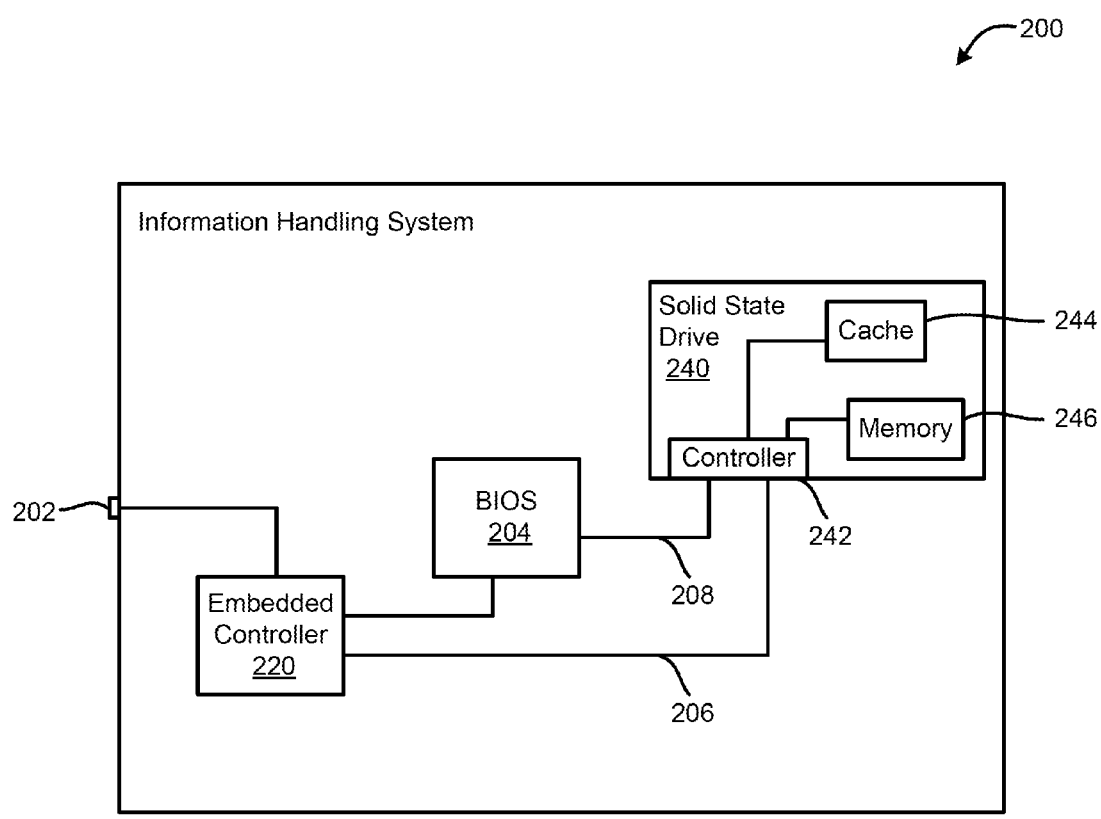
FIG. 2 is another block diagram of the information handling system including a more detailed solid state drive according to at least one embodiment of the present disclosure.

FIG. 2 illustrates an information handling system 200 including a power button 202, a basic input/output system (BIOS) 204, an embedded controller 220, and a solid state drive 240 according to at least one embodiment of the present disclosure. The solid state drive 240 can include a controller 242, a cache 244, and a memory 246. In an embodiment, the embedded controller 220 can communicate with the power button 202, with the BIOS 204, and with the controller 242 of the solid state drive 240. In an embodiment, the embedded controller 220 can communicate with the controller 242 via a dedicated connector 206, such as a pin 11 connector between the embedded controller and the solid state drive. The BIOS 204 can communicate with the controller 242, via a communication bus 208. In an embodiment, the controller 242 is in communication with the cache 244 and with the memory 246, and can transfer data between the cache and the memory.

During operation of the information handling system 200, the controller 242 can receive read and/or write instructions for the memory 246 of the solid state drive 240. In an embodiment, the memory 246 of the solid state drive 240 can be a non-volatile memory, such as a flash memory. In an embodiment, the controller 242 can control how data is stored in the memory 246. For example, the controller 242 can implement wear leveling in the memory 246, such that write accesses to different portions of the memory are even. In this embodiment, data that is received at the controller 242 and that is associated with a write instruction, can be temporarily stored in the cache 244 prior to the controller writing the data to the memory 246.

After a predetermined amount of data, such as enough data to be written to an entire page of the memory 246, has been stored in the cache 244, the controller 242 can then write the data in the cache to the memory. However, a sudden power loss, such as a power loss from a forced shutdown, can take place while data is being stored in the cache 244 prior to a write to the memory 246. In this situation, the loss of power can result in all of the data in the cache being lost because the cache 244 can be a volatile memory that does not retain data if power is not provided to the cache. In an embodiment, a forced shutdown can be referred to as a dirty shutdown if the data in the cache 244 is lost during the shutdown.

In an embodiment, an individual can cause a forced shutdown of the information handling system 200 by pressing and holding the power button 202 for a predetermined amount of time. In an embodiment, the predetermined amount of time can be four seconds, six seconds, ten seconds, or the like. The embedded controller 220 can monitor the power button 202, can detect when the power button 202 is pressed, and can determine that a forced shutdown of the information handling system 200 has been initiated. The embedded controller 220 can then determine whether the embedded controller is connected to the controller 242 via the dedicated connector 206.

If the dedicated connector 206 is present, the embedded controller 220 can provide a cache flush command to the controller 242 via the dedicated connector. In an embodiment, the cache flush command can be provided to the controller 242 by toggling a voltage on the dedicated connector 206, such as toggling from a high voltage level to a low voltage level, or from a low voltage level to a high voltage level. However, if the dedicated connector 206 is not available, the embedded controller 220 can provide a system management interrupt (SMI) signal to the BIOS 204 in response to detecting that a forced shutdown has been initiated. The BIOS 204 can then provide a cache flush command to the controller 242 via a standby immediately (STBI) command over the communication bus 208 between the BIOS 204 and the solid state drive 240. In an embodiment, the STBI command can interrupt the serial AT attachment (SATA) command sequence for the solid state drive 240, such that any pending SATA commands in the controller 242 are lost. However, in an embodiment, the toggling of the dedicated connector 206 can cause the cache flush without interrupting the SATA command sequence.

Upon receiving the cache flush command, either from the embedded controller 220 via the dedicated connector 206 or the STBI command from the BIOS 204, the controller 242 can issue a cache flush in the solid state drive 240, such that the data stored in the cache 244 is written to the memory 246. In an embodiment, writing the data from the cache 244 to the memory 246 can be completed in less time than the predetermined amount of time needed to complete the request for the forced shutdown. Therefore, any data in the cache 244, when a forced shutdown is initiated, will be stored in the memory 246 prior to the forced shutdown operation being completed.

In an embodiment, if the force shutdown is aborted, such that the individual releases the power button 202 prior to the end the predetermined amount of time, the embedded controller 220 can send a signal to the controller 242 to cause the controller 242 and the solid state drive to resume normal operations. In an embodiment, the signal from the embedded controller 220 can be toggling the dedicated connector 206 again, to send a signal via the BIOS 204 and communication bus 208, or the like. If the forced shutdown is aborted, the cache flush command results in an additional wear leveling write to the memory 246 being performed without any data from the cache 244 being lost.

Figure 3:
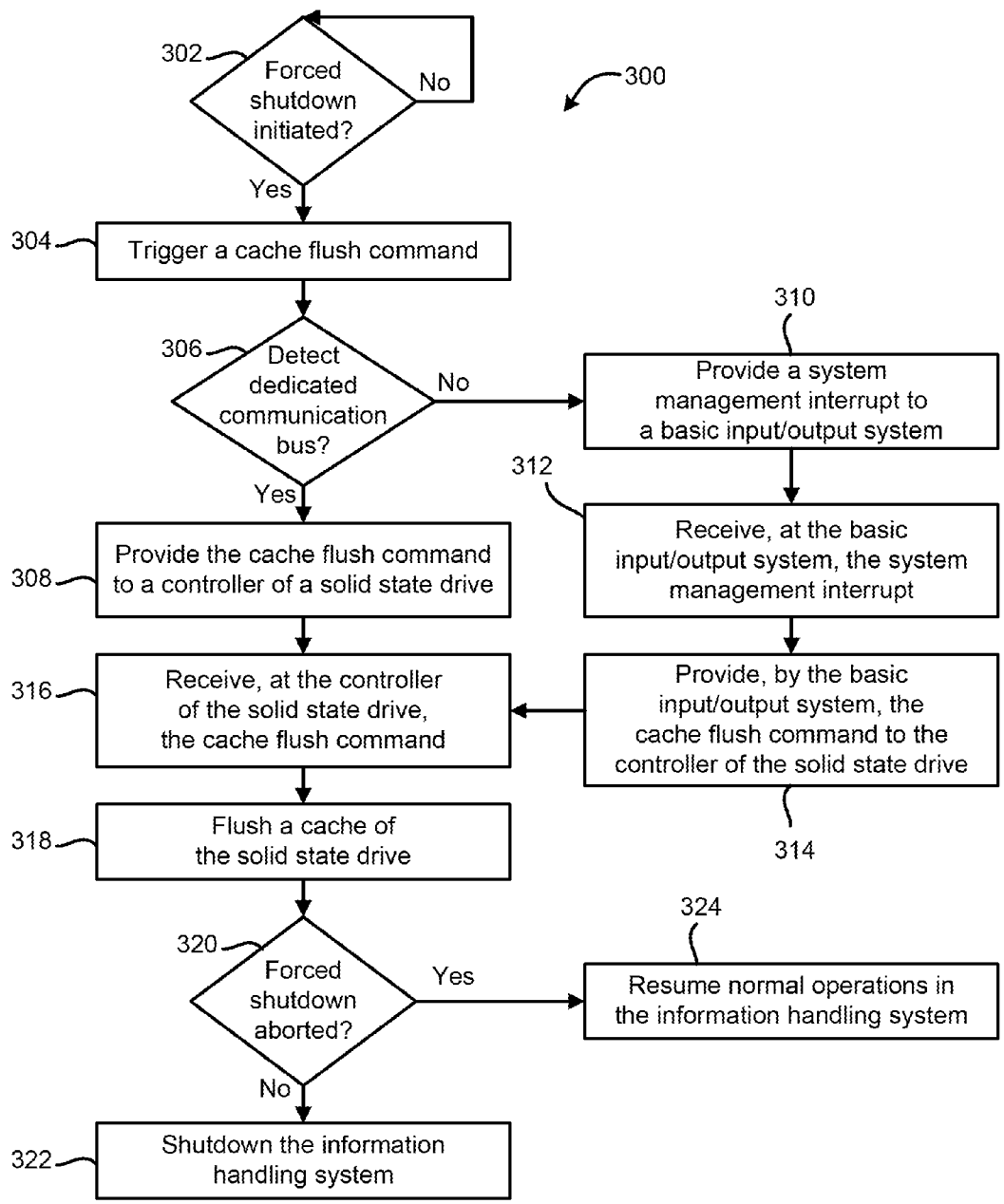
FIG. 3 is a flow diagram of a method for preventing data corruption in the solid state drive after dirty shutdown power loss of the information handling system according to at least one embodiment of the present disclosure.

FIG. 3 is a flow diagram of a method 300 for preventing data corruption in a solid state drive after dirty shutdown power loss of an information handling system according to at least one embodiment of the present disclosure. At block 302, a determination is made whether a forced shutdown of the information handling system is initiated. In an embodiment, the determination can be made by an embedded controller of the information handling system. When the forced shutdown is initiated, the flow moves to block 304 and a cache flush command is triggered. In an embodiment, the forced shutdown is initiated if a power button of the information handling system is pressed for a first predetermined amount of time. At block 306, a determination is made whether a dedicated connector is detected. In an embodiment, the dedicated connector can be the pin 11 connector, such as communication bus 206 of FIG. 2, between the embedded controller and a solid state drive of the information handling system.

If the dedicated communication is detected, the cache flush command is provided to a controller of the solid state drive at block 310 and the flow continues at block 316. However, if the dedicated connector is not detected, a system management interrupt is provided to a basic input/output system (BIOS) at block 310. In an embodiment, the system management interrupt is provided to the BIOS by the embedded controller via a system management interrupt bus. At block 312, the system management interrupt is received at the BIOS. In response to receiving the system management interrupt, the cache flush command is provided to the controller of the solid state drive by the BIOS at block 314.

At block 316, the cache flush command is received at the controller of the solid state drive. A cache of the solid state drive is flushed at block 318. In an embodiment, the controller of the solid state drive can flush the cache by storing all of the data located within the cache into a non-volatile memory of the solid state drive. At block 320, a determination is made whether the forced shutdown of the information handling system is aborted. In an embodiment, the forced shutdown is aborted if the power button of the information handling system is release before a second predetermined amount of time is reached. If the forced shutdown is not aborted, the information handling system is shutdown at block 322, and the data from the cache is securely stored in the non-volatile memory of the solid state drive. However, if the forced shutdown is aborted, normal operations are resumed in the information handling system at block 324.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a first controller to receive an indication that a forced shutdown of the information handling system has been initiated, and to trigger a cache flush command in response to receiving the indication that the forced shutdown has been initiated; and
   a solid state drive configured to communicate with the first controller, the solid state drive including:
      a memory to store data;
      a cache to buffer data prior to writing the data in the memory; and
      a second controller configured to communicate with the cache and with the memory, the second controller to write the data in the cache to the memory in response to a pre-determined amount of data being stored in the cache, the second controller to receive the cache flush command prior to the pre-determined amount of data being stored in the cache, in response to the cache flush command being received, to flush the cache by writing the data in the cache to the memory prior to the forced shutdown being executed, wherein the data flushed from the cache is written to the memory via a wear leveling write, wherein accesses to different portions of the memory are even during the wear leveling write, the second controller to resume normal operations after the flush of the cache and in response to the forced shutdown being aborted, wherein the flush of the cache results in an additional wear leveling write to the memory based on the data in the cache being stored in the memory prior to the pre-determined amount of data being stored in the cache and the forced shutdown being aborted.

2. The information handling system of claim 1, wherein the forced shutdown has been initiated for a predetermined amount of time before the forced shutdown is executed.

3. The information handling system of claim 1, further comprising:
   a dedicated connector between the first controller and the second controller, wherein the first controller provides the cache flush command to the second controller over the dedicated connector, wherein the dedicated connector is a physical connector located only between the first controller and the second controller.

4. The information handling system of claim 3, wherein the cache flush command being provided over the dedicated connector results in the flush of the cache without causing a break in a SATA command sequence.

5. The information handling system of claim 1, further comprising:
   a basic input/output system configured to communicate with the controller and with the second controller, the basic input/output system to receive a system management interrupt from the first controller, and to provide the cache flush command to the second controller in response to the system management interrupt.

6. The information handling system of claim 5, wherein the basic input/output system provides the cache flush command to the second controller via a standby immediately command, wherein the standby immediately command causes the second controller to flush the cache by writing the data in the cache to the memory, and causes a break in a SATA command sequence.

7. A method comprising:
   buffering data in a cache of a solid state drive prior to writing the data to a memory of the solid state drive, wherein the data in the cache is written to the memory in response to a pre-determined amount of data being stored in the cache;
   detecting, at a first controller, an indication that a forced shutdown of an information handling system has been initiated;
   triggering, by the first controller, a cache flush command in response to receiving the indication that the forced shutdown has been initiated;
   receiving, at a second controller, the cache flush command prior to the pre-determined amount of data being stored in the cache;
   in response to receiving the cache flush command, writing the data from the cache of the solid state drive to the memory of the solid state drive to flush the cache prior to the forced shutdown being executed, wherein the data flushed from the cache is written to the memory via a wear leveling write, wherein accesses to different portions of the memory are even during the wear leveling write; and
   resuming, at the second controller, normal operations after the cache is flushed and in response to the forced shutdown being aborted, wherein the flush of the cache results in an additional wear leveling write to the memory based on the data in the cache being stored in the memory prior to the pre-determined amount of data being stored in the cache and the forced shutdown being aborted.

8. The method of claim 7, wherein the forced shutdown has been initiated for a predetermined amount of time before the forced shutdown is executed.

9. The method of claim 7, wherein triggering the cache flush command comprises:
   providing, by the first controller, the cache flush command to the second controller over a dedicated connector, wherein the dedicated connector is a physical connector located only between the first controller and the second controller.

10. The method of claim 9, wherein providing the cache flush command over the dedicated connector results in the flush of the cache without causing a break in a SATA command sequence.

11. The method of claim 7, wherein triggering the cache flush command comprises:
providing, by the first controller, a system management interrupt to a basic input/output system;
receiving, at the basic input/output system, the system management interrupt; and
providing, by the basic input/output system, a cache flush command to the second controller in response to the system management interrupt.

12. The method of claim 11, wherein the basic input/output system provides the cache flush command to the second controller via a standby immediately command, wherein the standby immediately command causes the second controller to flush the cache by writing the data in the cache to the memory, and causes a break in a SATA command sequence.

13. A non-transitory computer readable medium when executed by a processor to cause the processor to implement a method, the method comprising:
buffering data in a cache of a solid state drive prior to writing the data to a memory of the solid state drive, wherein the data in the cache is written to the memory in response to a pre-determined amount of data being stored in the cache;
detecting an indication that a forced shutdown of an information handling system has been initiated;
triggering a cache flush command in response to receiving the indication that the forced shutdown has been initiated;
receiving the cache flush command prior to the pre-determined amount of data being stored in the cache;
in response to receiving the cache flush command, writing the data from the cache of the solid state drive to the memory of the solid state drive to flush the cache prior to the forced shutdown being executed, wherein the data flushed from the cache is written to the memory via a wear leveling write, wherein accesses to different portions of the memory are even during the wear leveling write; and
resuming, at the second controller, normal operations after the cache is flushed and in response to the forced shutdown being aborted, wherein the flush of the cache results in an additional wear leveling write to the memory based on the data in the cache being stored in the memory prior to the pre-determined amount of data being stored in the cache and the forced shutdown being aborted.

14. The non-transitory computer readable medium of claim 13, wherein the forced shutdown has been initiated for a predetermined amount of time before the forced shutdown is executed.

15. The non-transitory computer readable medium of claim 13, wherein triggering the cache flush command comprises:
providing, by the first controller, the cache flush command to the second controller over a dedicated connector, wherein the dedicated connector is a physical connector located only between the first controller and the second controller.

16. The non-transitory computer readable medium of claim 15, wherein providing the cache flush command over the dedicated connector results in the flush of the cache without causing a break in a SATA command sequence.

17. The non-transitory computer readable medium of claim 13, wherein triggering the cache flush command comprises:
providing, by a first controller, a system management interrupt to a basic input/output system;
receiving, at the basic input/output system, the system management interrupt; and
providing, by the basic input/output system, a cache flush command to a second controller in response to the system management interrupt.

18. The non-transitory computer readable medium of claim 17, wherein the basic input/output system provides the cache flush command to the second controller via a standby immediately command, wherein the standby immediately command causes the second controller to flush the cache by writing the data in the cache to the memory, and causes a break in a SATA command sequence.

* * * * *